(12) United States Patent
Huh et al.

(10) Patent No.: US 11,230,418 B2
(45) Date of Patent: Jan. 25, 2022

(54) FOOD CONTAINER WITH REDUCED ELUTION OF HAZARDOUS SUBSTANCES

(71) Applicant: HUVIS CORPORATION, Seoul (KR)

(72) Inventors: Mee Huh, Daejeon (KR); Kwang Hee Lee, Daejeon (KR); Woo Jin Kim, Daejeon (KR); Seung Jun Lee, Jeollanam-do (KR); Sang-hun Ha, Jeollanam-do (KR)

(73) Assignee: Huvis Corporation, Seoul (KR)

( * ) Notice: Subject to any disclaimer, the term of this patent is extended or adjusted under 35 U.S.C. 154(b) by 311 days.

(21) Appl. No.: 16/097,722

(22) PCT Filed: Nov. 30, 2016

(86) PCT No.: PCT/KR2016/013991
§ 371 (c)(1),
(2) Date: Oct. 30, 2018

(87) PCT Pub. No.: WO2018/062623
PCT Pub. Date: Apr. 5, 2018

(65) Prior Publication Data
US 2019/0382176 A1    Dec. 19, 2019

(30) Foreign Application Priority Data

Sep. 30, 2016 (KR) .......... 10-2016-0127001
Sep. 30, 2016 (KR) .......... 10-2016-0127002

(51) Int. Cl.
*B65D 81/26* (2006.01)
*B65D 65/40* (2006.01)
(Continued)

(52) U.S. Cl.
CPC ............ *B65D 65/40* (2013.01); *B29C 51/002* (2013.01); *B29C 51/14* (2013.01); *B65D 81/38* (2013.01);
(Continued)

(58) Field of Classification Search
CPC ........ B65D 81/26; B65D 65/40; B65D 85/72; B65B 31/02; B65B 25/00; B29C 51/14;
(Continued)

(56) References Cited

U.S. PATENT DOCUMENTS 3,492,273 A    1/1970  Quisenberry
5,000,991 A    3/1991  Hayashi
(Continued)

FOREIGN PATENT DOCUMENTS

EP    1160274 A1    12/2001
JP    03111244 A     5/1991
(Continued)

OTHER PUBLICATIONS

European Search Report issued in EP 16917824.1, dated Oct. 28, 2019.
(Continued)

*Primary Examiner* — Ellen S Hock
(74) *Attorney, Agent, or Firm* — Meunier Carlin & Curfman LLC

(57) ABSTRACT

The present invention relates to a food container with a reduced amount of elution of hazardous substances. As the food container according to the present invention has a structure in which a foamed layer and a PETG resin layer are laminated, compressive strength is improved and moldability is excellent, so that the food container may be provided in various sizes and shapes. Moreover, the present invention has a harmless effect to a human body due to a remarkably low amount of elution of hazardous substances.

8 Claims, 4 Drawing Sheets

(51) Int. Cl.
  *B29C 51/00*  (2006.01)
  *B29C 51/14*  (2006.01)
  *B65D 81/38*  (2006.01)
  *B65D 85/72*  (2006.01)
  *C08J 9/36*   (2006.01)
  *B29K 67/00*  (2006.01)
  *B29K 105/04* (2006.01)
  *B29L 31/00*  (2006.01)

(52) U.S. Cl.
  CPC ............. B65D 85/72 (2013.01); C08J 9/365 (2013.01); *B29K 2067/003* (2013.01); *B29K 2105/04* (2013.01); *B29L 2031/712* (2013.01); *C08J 2367/02* (2013.01); *C08J 2467/02* (2013.01)

(58) Field of Classification Search
  CPC . C08J 9/365; C08J 2367/02; B29K 2067/003; B29K 2105/04; B29L 2031/712
  USPC ........................................................ 428/35.7
  See application file for complete search history.

(56) References Cited

U.S. PATENT DOCUMENTS 6,365,249 B1  4/2002  Al Ghatta

2006/0073294 A1*  4/2006  Hutchinson ......... F16L 55/1157
                                                    428/35.7
2011/0266168 A1* 11/2011  Longo .................. B65D 81/262
                                                    206/204

FOREIGN PATENT DOCUMENTS

| | | |
|---|---|---|
| JP | 06-021847 Y2 | 6/1994 |
| JP | 1996-003358 A | 1/1996 |
| JP | 1996-151470 A | 6/1996 |
| JP | 2000109042 A | 4/2000 |
| JP | 2000289173 A | 10/2000 |
| JP | 2001315277 A | 11/2001 |
| JP | 2006248030 A | 9/2006 |
| JP | 3163094 U | 9/2010 |
| JP | 2013-212643 A | 10/2013 |
| JP | 2013199532 A | 10/2013 |
| KR | 10-2009-0082799 A | 7/2009 |
| KR | 10-2014-0038973 A | 3/2014 |
| KR | 10-1459275 B1 | 11/2014 |

OTHER PUBLICATIONS

Japanese Office Action issued in JP 2018-556326, dated Nov. 1, 2019.

International Search Report and Written Opinion. Korean Intellectual Property Office, dated Jun. 23, 2017. 11 pages, including English Translation of International Search Report.

* cited by examiner

FOOD CONTAINER WITH REDUCED ELUTION OF HAZARDOUS SUBSTANCES

TECHNICAL FIELD

The present invention relates to a food container.

BACKGROUND ART

Conventionally, food containers such as beverage containers, yogurt containers, single-size containers and containers for cup ramen, and disposable containers for medical supplies require properties such as tensile strength, thermal resistance, a thermal barrier property, light resistance, moldability, surface glossiness, compressive strength, and printability.

Generally, a synthetic resin (plastic) is advantageous in that it is light and strong, not rusted or rotted, easily transparent and colored and easily mass-produced, has excellent electrical insulation and excellent heat insulation, is clean, and excellent in food preservation, and thus is used for various purposes.

Particularly, containers manufactured of synthetic resins have been used for various purposes due to many advantages of low costs, light weights, easy molding and rigidity, and particularly, have been widely used as containers for food. As synthetic resins used for food containers, polystyrenes, polypropylenes, AS resins, and polycarbonates have been widely used.

However, when such a synthetic resin container is used as a food container, an environmental hormone, which is a hazardous substance, is eluted from a surface of the synthetic resin container and comes in contact with foods, and thus may cause a problem of threatening the health of the human body. The environmental hormone is a substance that disturbs the endocrine system from which human hormones arise, and breaks the balance of the human body and hinders the development of the human body.

Hormones are substances that help the exchange of information between various cells and organs, and are dissolved in the blood and act on receptors of certain cells. If, rather than a hormone in the body, an environmental hormone having a similar chemical structure to the hormone, binds to the receptor, or an environmental hormone blocks an opening of the receptor, there may be an abnormality in the human body.

According to the US Environmental Protection Agency (EPA), such environmental hormones that have been proven to be hazardous until now are only a few, which include DDT used as an insecticide, DES used as a medication for preventing miscarriages, and dioxin generated during incineration of industrial wastes. However, other environmental hormones suspected to be hazardous mostly include an organic chlorine-based substance having a chemical structure similar to that of DDT. Other than these, vinclozolin, chlorothalonil, endosulfan, fenvalerate, styrene dimers, styrene trimers, bisphenol A, nonylphenol, and some heavy metal compounds are also classified as environmental hormones.

A styrene trimer, assumed as an environmental hormone, is generated from a cup ramen container, and bisphenol A is generated from a coating layer in a beverage can, a baby bottle, etc.

Theoretically, these environmental hormones pose risks to all of the organs including the genitalia and affect the immune and nervous systems as well, and therefore they may lead to frequent sickness, and disorders such as anxiety, a lack of concentration, etc.

To solve these problems, conventionally, a method of blocking the conduction of heat of contents in a cup or container by wrapping a paper (napkin) or thick corrugated paper cut to size, or double covering the cup or container with another disposable cup or the like has been used.

When an external wrapping material is used by being rolled in a round shape, it has a heat insulating effect, but since the cup and an insulating sheet must be separately manufactured for use, due to separate manufacturing processes and a large amount of waste paper, high production and processing costs are needed.

Another method is to mold a container using a foam sheet manufactured by foaming a polystyrene resin. In this case, there is be a drawback in that, during the use of a thermal-resistant product, a styrene monomer is released and harmful to the human body.

Therefore, there is an urgent demand for development of a food container which satisfies basic physical properties of food containers, such as thermal resistance, moldability, strength, etc., does not generate a hazardous substance, has an improved thermal barrier property, thereby having an excellent heat insulation and safety in use.

DISCLOSURE

Technical Problem

The present invention is directed to providing a food container which satisfies the basic physical properties of a food container, for example, compressive strength, thermal resistance, printability and moldability, and has excellent safety in use due to a reduced elution amount of a hazardous substance.

Technical Solution

To attain the above-mentioned object, the present invention provides a food container which has a multilayer structure including a foamed layer having an average cell size of 100 to 500 μm and a resin layer laminated on one or both surfaces of the foamed layer, wherein the resin layer is formed of a resin having a repeating unit of Formula 1 below:

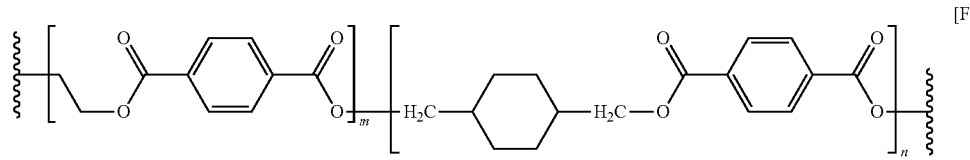

[Formula 1]

In Formula 1, m and n represent mole fractions of repeating units, and range from 1 to 100, respectively.

In addition, the present invention provides a method of manufacturing a food container, which includes: forming a resin coating layer having a repeating unit of Formula 1 below on one or both surfaces of a foam sheet; and thermoforming the foam sheet coated with the resin having the repeating unit of Formula 1.

[Formula 1]

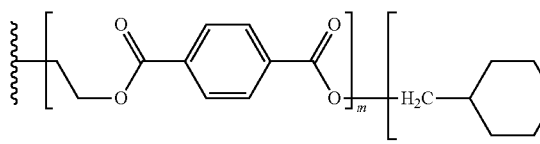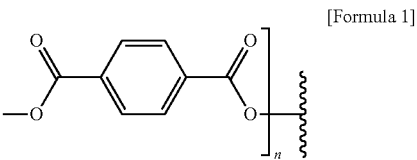

In Formula 1, m and n represent mole fractions of repeating units, and range from 1 to 100, respectively.

Advantageous Effects

A food container according to the present invention has a multilayer structure which has a foamed layer controlled in cell size and a resin layer laminated on one or both surfaces of the foamed layer, thereby improving compressive strength, and having less deformation due to a physical force and improved moldability due to improved elongation, so that it can be provided in various sizes and shapes. The food container according to the present invention can easily store food due to low oxygen and moisture permeability, and prevent deformation even in high-temperature water due to excellent heat resistance. In addition, the food container according to the present invention is harmless to the human body due to a considerably low elution amount of a hazardous substance, and has improved strength, printability and moldability and a superior thermal barrier property, thereby exhibiting improved heat insulation for food.

MODES OF THE INVENTION

Figure 1:
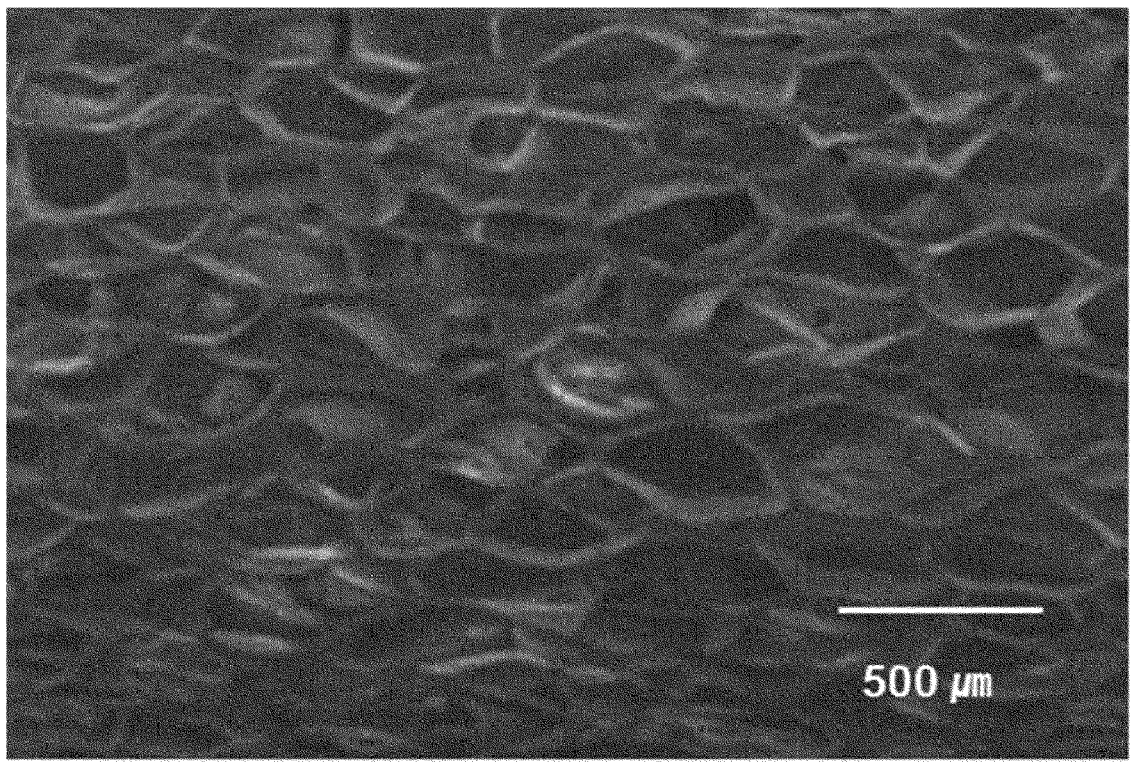
FIG. 1 is a scanned electron microscope (SEM) image showing a cell size of a foam sheet of a food container according to an example.

The present invention may have various modifications and various examples, and thus specific examples are illustrated in the drawings and described in detail in the detailed description.

However, it should be understood that the present invention is not limited to specific embodiments, and includes all modifications, equivalents or alternatives within the idea and technical scope of the present invention. In the explanation of the present invention, detailed description of the related art will be omitted if it is determined that the gist of the present invention can be obscured.

The terms "first," "second" and the like may be used to describe various components, but the components should not be limited by these terms. The terms are used only to distinguish one component from another component.

The terms used in the present invention are used only to explain specific examples, not to limit the present invention. Singular expressions include plural referents unless clearly indicated otherwise in the context.

The terms "include," "have" and the like used herein designate the presence of characteristics, numbers, stages, actions, components or members described in the specification or a combination thereof, and it should be understood that the possibility of the presence or addition of one or more other characteristics, numbers, stages, actions, components, members or a combination thereof is not excluded in advance.

Accordingly, the configuration illustrated in the example described in the specification is merely the most preferable example of the present invention, but does not represent all of the technical ideas of the present invention. Therefore, there may be various equivalents and modified examples, which can substitute for these at the time of the application of the present invention.

Conventional food containers, for example, beverage containers, yogurt containers, single-size containers and containers for cup ramen, are generally manufactured of a polystyrene resin. When a synthetic resin container manufactured of such polystyrene resin is used as a food container, an environmental hormone, which is a hazardous substance, is eluted from a surface of the synthetic resin container and comes in contact with food, and it may cause a problem of threatening the health of the human body. A paper food container for preventing the elution of such a hazardous substance has problems of a significantly low thermal barrier property, significantly low compressive strength, and a 3 to 10-fold higher production cost than that of a synthetic resin container.

The present invention is provided to solve the problems of the conventional food container, and provides a food container, which is manufactured in a multilayer structure by laminating a foam layer made of a polyethyleneterephthalate (PET) resin such that it has a controlled cell size, improved compressive strength and a thermal barrier property and a relatively low glass transition temperature and a resin layer having a relatively high glass transition temperature, thereby significantly reducing an elution amount of a hazardous substance.

The food container according to the present invention has a multilayer structure including a foamed layer having an average cell size of 100 to 500 μm and a resin layer laminated on one or both surfaces of the foamed layer, wherein the resin layer is formed of a resin having a repeating unit of Formula 1 below.

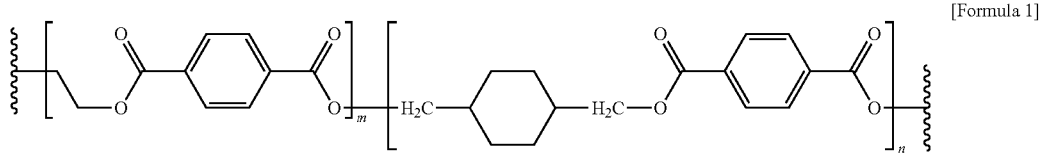

[Formula 1]

In Formula 1, m and n represent mole fractions of repeating units, and range from 1 to 100, respectively.

For example, m and n are mole fractions of repeating units, and a ratio of m and n may range from 1:9 to 7:2. Specifically, in a resin forming the resin layer, a content of the polymerization unit derived from cyclohexanedimethanol (CHDM) in a molecule may be 20 mol % or more, and specifically, the content of the polymerization unit derived from CHDM may range from 20 to 90 mol %, or 30 to 90 mol %. In Formula 1, when the content of the polymerization unit induced from CHDM satisfies the above-mentioned range, a melting point (Tm) may be reduced due to an induced decrease in crystallinity of the resin, resulting in the achievement of excellent processability.

Specifically, an average cell size of the foamed layer may be 110 to 450 μm, 130 to 430 μm, 150 to 410 μm, 180 to 400 μm, 200 to 380 μm, 220 to 360 μm or 250 to 350 μm. When the average cell size of the foamed layer is within the above-mentioned range, the thermal barrier property and compressive strength of the food container are improved, and it is easy to form a deeper inside of the food container in molding of the food container. When the cell size is larger than 500 μm, it is difficult to produce a deeper container by thermoforming in manufacture of the food container, and compressive strength may be reduced, and when the cell size is smaller than the above-mentioned range, the compressive strength and the thermal barrier property may be reduced.

In one example, a glass transition temperature (Tg) of the resin constituting the foamed layer may be 70 to 90° C., 75 to 85° C. or 80 to 90° C. In addition, a glass transition temperature of the resin constituting the resin layer may be 65 to 95° C., 70 to 90° C., 75 to 85° C. or 78 to 90° C. Since the foamed layer according to the present invention satisfies the above-mentioned range of the glass transition temperature, a food container having excellent thermal resistance is provided.

The multilayer structure may be a structure with 2 to 10 layers, 2 to 8 layers, 2 to 4 layers, or 2 layers.

foamed layer of a resin having the glass transition temperature within the above-mentioned range and a PETG resin layer having a non-crystalline region are laminated, the present invention satisfies both moldability and thermal resistance of a food container.

In the present invention, the resin constituting the resin layer may not have a melting point (Tm) within the range of 40 to 270° C. In the resin layer according to the present invention, a content of the polymerization unit derived from CHDM in a molecule constituting Formula 1 satisfies the above range, and thus includes a repeating unit that decreases the melting point of the resin as a main repeating unit. Therefore, since the resin layer according to the present invention does not have a melting point, it may have a low degree of crystallinity, and thus exhibit an excellent adhesive property. In addition, the non-crystallinity may result in excellent lightness.

In one example, in the present invention, a degree of crystallinity of the resin forming the resin layer may be less than 10%. Specifically, the degree of crystallinity may be 5% or less, 2% or less, 0 to 2%, 0.001 to 0.5%, or 0.001 to 0.1%, and more specifically, the degree of crystallinity may be 0%. Since the resin forming the resin layer according to the present invention satisfies the degree of crystallinity within the above-mentioned range, viscosity may be maintained within a suitable range even at a relatively low temperature in the manufacture of a food container, and thus excellent processability may be exhibited.

The food container according to the present invention has a bilayer structure, in which an inner layer of the container is formed of the foamed layer, and an outer layer of the container may be formed of the resin layer. That is, the inner layer of the container is the foamed layer of the resin having a glass transition temperature of 65 to 95° C., and the outer layer of the container is the resin layer of the resin having a repeating unit of Formula 1 below.

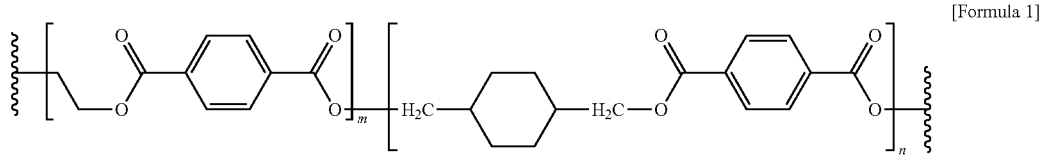

[Formula 1]

In the present invention, the resin having the repeating unit of Formula 1 may be, for example, a polyethylene terephthalate glycol (hereinafter, referred to PETG) resin. Such a PETG resin may have a CHDM-copolymerized structure. The CHDM acts to prevent crystallization of the resin, and the CHDM-copolymerized PETG has a non-crystalline region. Therefore, the viscosity of the PETG resin is easily maintained, and thus a cohesive property between the foamed layer and the resin layer is imparted. Since the present invention has a structure in which a In Formula 1, m and n represent mole fractions of repeating units, and range from 1 to 100, respectively.

The food container according to the present invention may have a styrene elution amount of 50 mg/kg or less while being heated in an 800 W microwave oven for 5 minutes. Specifically, when a prepared food container sample is heated in an 800 W microwave oven for 5 minutes, an elution amount of a volatile substance is measured. For example, when the food container is heated in a microwave oven, the styrene elution amount may be 20 mg/kg or less, 10 mg/kg or less or 0.01 mg/kg or less, and more specifically, styrene may not be eluted. In the food container according to the present invention, a volatile substance such as toluene, ethylbenzene, isopropyl benzene or n-propyl benzene, in addition to the styrene, may not be eluted, and therefore, it can be seen that, when the food container according to the present invention is heated in a microwave oven, it is possible to effectively prevent the human body from being exposed to a hazardous substance.

The food container according to the present invention may have a difference in temperature between the inside and outside of the container of 10° C. or more, measured, under ambient conditions at room temperature, two minutes after 60 to 100° C. water is put into the container at 70% (v/v). This shows that the food container according to the present invention exhibits an excellent thermal barrier property, and specifically, the difference in temperature between the inside and outside of the container is measured 2 minutes after 100° C. water is put into the container at 70% (v/v). For example, the difference in temperature between the inside and outside of the food container under the above-described conditions may be 13 to 40° C., 15 to 35° C., 20 to 32° C. or 21.5 to 30° C.

As an example, two minutes after 60 to 100° C. water was put into the food container according to the present invention at 70% (v/v), when the outer temperature of the container is 40° C., the inner temperature of the container may be 60 to 80° C. As the difference in temperature between the inside and outside of the container according to the present invention is maintained relatively large under the above-mentioned conditions, it can be seen that the food container has an excellent thermal barrier property, and thus effectively improves heat insulation for food.

In the present invention, the foamed layer may be a foam sheet of a PET resin, and the resin layer may be a coating layer of a PET resin. The foamed layer may be provided in the form of a relatively thin foam sheet to achieve lightness, and the coating layer may be provided to achieve compressive strength.

The foamed layer according to the present invention, that is, the foam sheet, may have a density of 30 to 400 kgf/m$^3$. Specifically, the density of the foam sheet may be 50 to 350 kgf/m$^3$, 70 to 300 kgf/m$^3$, 80 to 250 kgf/m$^3$, 90 to 200 kgf/m$^3$ or 100 to 150 kgf/m$^3$. As the density of the foamed layer according to the present invention is in the above-mentioned range, the foamed layer may have a small thickness and improved compressive strength.

Since the PETG resin does not generate a hazardous substance, there is a low risk in the manufacturing process and incineration, and therefore, when food is cooked using the food container according to the present invention, the elution amount of a hazardous substance is considerably reduced. In addition, when a coating layer is formed of the PETG resin, it imparts strength to the food container, thereby improving compressive strength, and has excellent printability and moldability. Therefore, a food container with a good appearance may be easily manufactured.

Specifically, the multilayer structure may have an average thickness of 1.2 to 4 mm, 1.5 to 3.5 mm, 1.8 to 3 mm, or 2 mm. In addition, a thickness ratio of the foamed layer to the resin layer may be, specifically, 10:0.2 to 1.5, 10:0.3 to 1, or 10:0.5. As the food container according to the present invention has the foamed layer and the resin layer, which have the above-mentioned thickness range, compressive strength may be improved, and lightness may also be satisfied.

As an example, when the multilayer structure forming the food container according to the present invention is a bilayer structure, the food container may have an average thickness of 2 mm, and at this time, the foamed layer may have an average thickness of 1.9 mm, and the resin layer may have an average thickness of 0.1 mm.

The food container according to the present invention may satisfy a condition represented by Mathematical Expression 1 below.

$$|V_1-V_0|/V_0\times100<5\% \qquad \text{[Mathematical Expression 1]}$$

In Mathematical Expression 1, $V_0$ is a volume (mm$^3$) of the food container before being exposed to 100° C., and $V_1$ is a volume (mm$^3$) of the food container after being exposed to 100° C. for 20 minutes.

Specifically, a dimensional variation before and after the manufactured food container sample is exposed to 100° C. for 20 minutes is measured. This is a measured value corresponding to a long-term dimensional variation of the food container according to the present invention. For example, the volume may refer to a value calculated by multiplying a length, a width and a thickness of a thermal-resistant material. For example, the dimensional variation according to Mathematical Expression 1 may be 3% or less, 1% or less, 0.1% or less, 0.001% or less, or 0.0001 to 0.001%, and specifically, there may be no change in dimension. As the above-mentioned range of the value of Mathematical Expression 1 is satisfied, it can be seen that there is almost no change in shape of the food container according to the present invention even when used in a high temperature environment. Therefore, it can be seen that the food container according to the present invention has excellent thermal resistance.

When the value of Mathematical Expression 1 is more than 5%, it can mean that swell, distortion, discoloration or deformation may easily occur in the food container.

The food container according to the present invention may have compressive strength of 40 kgf or more, which is measured when a load is applied vertically to one surface or a lower surface of the food container at a speed of 100 mm/min.

Specifically, the compressive strength may be measured when a load is applied vertically using Load Cell 1 KN at a speed of 100 mm/min, and for example, the compressive strength may be 41 to 95 kgf, 45 to 90 kgf, 48 to 85 kgf or 50 to 80 kgf. The food container according to the present invention may have the above-mentioned range of compressive strength by forming a PET foam sheet as the inner layer of the container, and forming a coating layer consisting of a PETG resin as an outer layer of the container. Such a food container has an advantage in that it is not easily deformed by an external physical force.

The food container according to the present invention may have a moisture permeability of 16 g/m$^2$·day or less, which is measured according to ASTM D 1249. Specifically, the moisture permeability of the manufactured food container sample is measured under conditions of 37.8±1° C. and 100% R.H for 30 minutes. For example, the moisture permeability measured under the above conditions may be 15 g/m$^2$·day or less, 13 g/m$^2$·day or less, 1 to 10 g/m$^2$·day, 2 to 9 g/m$^2$·day or 3 to 8.8 g/m$^2$·day.

In addition, the food container according to the present invention may have an oxygen permeability of 1,500 cc/m$^2$·day or less, which is measured according to ASTM D 3985. Specifically, the oxygen permeability of the manufactured food container sample is measured under conditions of 23±1° C. for 30 minutes. For example, the oxygen permeability measured under the above conditions may satisfy 50 to 1,450 cc/m²·day, 100 to 1,400 cc/m²·day, or 150 to 1,350 cc/m²·day. The food container according to the present invention is manufactured by forming a PET foam sheet as the inner layer of the container and forming a coating layer consisting of a PETG resin as the outer layer of the container, thereby satisfying the moisture permeability and oxygen permeability as described above, and the food container according to the present invention may satisfy the above-mentioned ranges of low moisture permeability and low oxygen permeability, thereby exhibiting excellent oxygen and moisture barrier performance, resulting in the extension of the preservation period of food.

As an example, the food container according to the present invention may have a transverse direction (TD) tensile strength and a machine direction (MD) tensile strength, which are measured according to ASTM D 638, within a range of 4 to 20. Specifically, when a tensile strength is measured at a speed of 5 mm/min using a universal testing machine (Model 3367, Instron), the transverse direction (TD) tensile strength may be in the range of 4.5 to 7 MPa, and the machine direction (MD) tensile strength may be in the range of 4 to 6 MPa. As a PET foam sheet is formed as the inner layer of the container, and a coating layer consisting of a PETG resin is formed as the outer layer of the container, the food container according to the present invention may exhibit tensile strengths within the above-mentioned ranges, and thus it may not be easily deformed by a physical force.

As another example, the food container according to the present invention may have a transverse direction (TD) elongation of 3 to 10% and a machine direction (MD) elongation of 5 to 20%, which are measured according to ASTM D 638. Specifically, when elongations are measured using a universal testing machine (Model 3367, Instron), the transverse direction (TD) elongation may be in a range of 4 to 7%, and the machine direction (MD) elongation may be in a range of 7 to 15%. The food container according to the present invention may satisfy the above-mentioned ranges of TD and MD elongations by forming a PET foam sheet as the inner layer of the container, and forming a coating layer consisting of a PETG resin as the outer layer of the container, and thereby exhibit excellent moldability.

The present invention provides a method of manufacturing the above-described food container.

Specifically, the method of manufacturing a food container according to the present invention may include forming a resin coating layer having a repeating unit of Formula 1 below on one or both surfaces of a foam sheet; and thermoforming the foam sheet coated with the resin having the repeating unit of Formula 1.

In Formula 1, m and n represent mole fractions of repeating units, and range from 1 to 100, respectively.

In the present invention, a thermoforming temperature may be 140 to 200° C. Specifically, the thermoforming temperature may be 140 to 180° C., 140 to 170° C., 140 to 160° C., 140 to 150° C. or 140° C. The present invention may remarkably improve moldability without degradation in strength and physical properties of the food container by thermoforming the food container within the above temperature range.

As an example, a glass transition temperature (Tg) of the resin constituting the foam sheet may be 70 to 90° C., 75 to 85° C. or 80 to 90° C. In addition, a glass transition temperature of the resin having the repeating unit of Formula 1 may be 65 to 95° C., 70 to 90° C., 75 to 85° C. or 80 to 90° C. The foam sheet according to the present invention may have a glass transition temperature within the above-mentioned range, and thus can be used for manufacturing a food container having excellent thermal resistance.

The foam sheet may be a foamed layer, and the foamed layer may have an average cell size of 110 to 450 μm, 130 to 430 μm, 150 to 410 μm, 180 to 400 μm, 200 to 380 μm, 220 to 360 μm or 250 to 350 μm. When the average cell size of the foamed layer is in the above-mentioned range, the thermal barrier property and the compressive strength of the food container are improved, and it is easy to form a deeper inside of the food container during molding. When the cell size is larger than 500 μm, it is difficult to form a deeper food container by thermoforming, and therefore compressive strength may be degraded. When the cell size is smaller than the above-mentioned range, the compressive strength and the thermal barrier property may be degraded.

In the method of manufacturing a food container according to the present invention, the resin having the repeating unit of Formula 1 may be, for example, a PETG resin. Such a PETG resin may have a CHDM-copolymerized structure. CHDM serves to prevent crystallization of the resin, and thus the CHDM-copolymerized PETG has a non-crystalline region. Therefore, the viscosity of the PETG resin is easily maintained, and a cohesive property between the foamed layer and the resin layer is imparted. According to the method of manufacturing a food container according to the present invention, a food container having excellent moldability, thermal resistance and printability may be manufactured by applying a PETG resin having a non-crystalline region on one or both surfaces of the foam sheet of a resin having the above-mentioned range of a glass transition temperature.

As an example, 90% or more cells of the foam sheet according to the present invention may be closed cells (DIN ISO4590). This means that 90% or more cells are closed cells as indicated by a measured value of the foam sheet according to DIN ISO4590. For example, in the foam sheet, the closed cells account for 90 to 100% or 95 to 100% of the cells. As the foam sheet according to the present invention has the closed cells within the above-mentioned range, excellent thermal resistance, an excellent heat insulating property and an excellent heat insulation may be exhibited. Accordingly, the food container including the foam sheet may exhibit excellent thermal resistance, an excellent heat-insulating property and an excellent heat insulation. For example, the number of cells in the polyester foam sheet may be 1 to 30, 3 to 25 or 3 to 20 cells/mm.

[Formula 1]

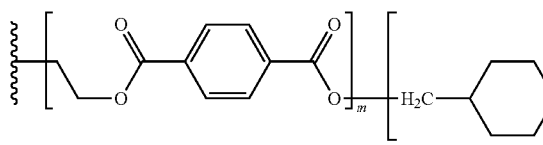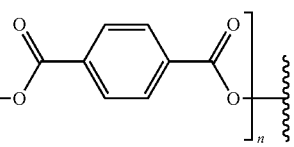

The method of manufacturing a food container according to the present invention may include forming a foam sheet by extruding a mixture containing a PET resin composition, and at this time, an extrusion temperature of the resin may be 50 to 100° C., 55 to 95° C. or 60 to 90° C., and foaming is performed at a relatively low temperature within the above-mentioned range, thereby easily maintaining the viscosity of the resin.

Meanwhile, the extrusion foaming according to the present invention is performed by hot-melting a resin and sequentially extruding and foaming the resin melt, and thus a process may be simplified, mass-production is facilitated, and cracks between beads during bead foaming, and granular destruction are prevented, resulting in superior tensile strength and compressive strength.

Hereinafter, the present invention will be described in further detail with reference to examples and comparative examples, but the scope of the present invention is not limited to the following descriptions.

EXAMPLE

To manufacture a food container according to the present invention, first, 100 parts by weight of a PET resin was dried at 130° C. to remove moisture, mixed with 1 part by weight of pyromellitic dianhydride, 1 part by weight of talc and 0.1 part by weight of Irganox (IRG 1010) with respect to 100 parts by weight of the moisture-removed PET resin in a first extruder and heated to 280° C., thereby preparing a resin melt. Subsequently, 5 parts by weight of butane gas as a foaming agent was added to the first extruder, with respect to 100 parts by weight of the PET resin, and extrusion foaming was performed, thereby obtaining a PET foam sheet. The obtained foam sheet has a density of approximately 120 kg/m$^3$, and a thickness of approximately 1.9 mm. Afterward, one surface of the foam sheet was extrusion-coated with PETG, thereby forming a coating layer with a thickness of 100 μm. And then, the foam sheet having the coating layer was subjected to thermoforming at 140° C., thereby manufacturing a food container. The manufactured food container had an average thickness of 2 mm. FIG. 1 is an SEM image showing a cell size of the foam sheet formed according to the example. Referring to FIG. 1, it can be confirmed that cells were formed to have an average size of 330 μm.

Comparative Example 1

A food container was manufactured by the same method as described in the example, except that a foam sheet (2.5 mm) was formed using a polystyrene (PS) resin instead of a PET resin, and a polystyrene coating layer (100 μm), instead of a PETG coating layer, was formed. At this time, an average cell size of the foam sheet was 180 μm.

Figure 2:
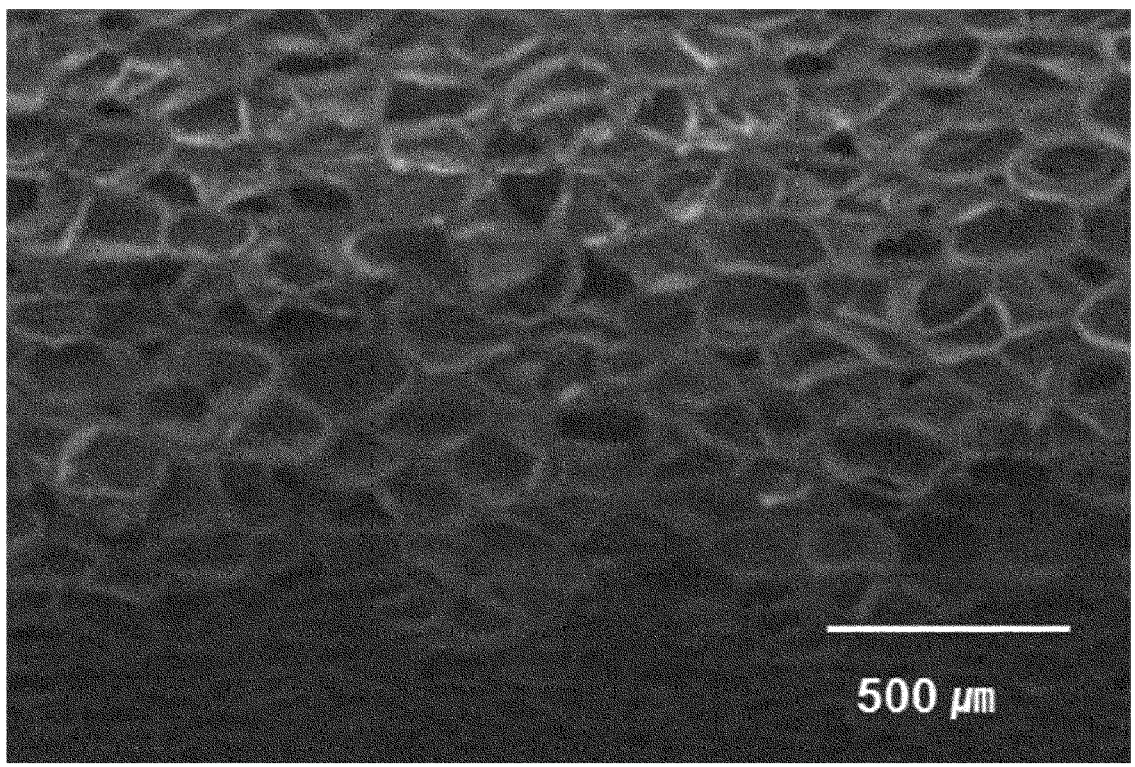
FIG. 2 is an SEM image showing a cell size of a foam sheet of a food container according to Comparative Example 1.

FIG. 2 is an SEM image showing a cell size of the foam sheet formed according to Comparative Example 1. Referring to FIG. 2, it can be confirmed that cells were formed to have an average size of 180 μm.

Comparative Example 2

Figure 3:
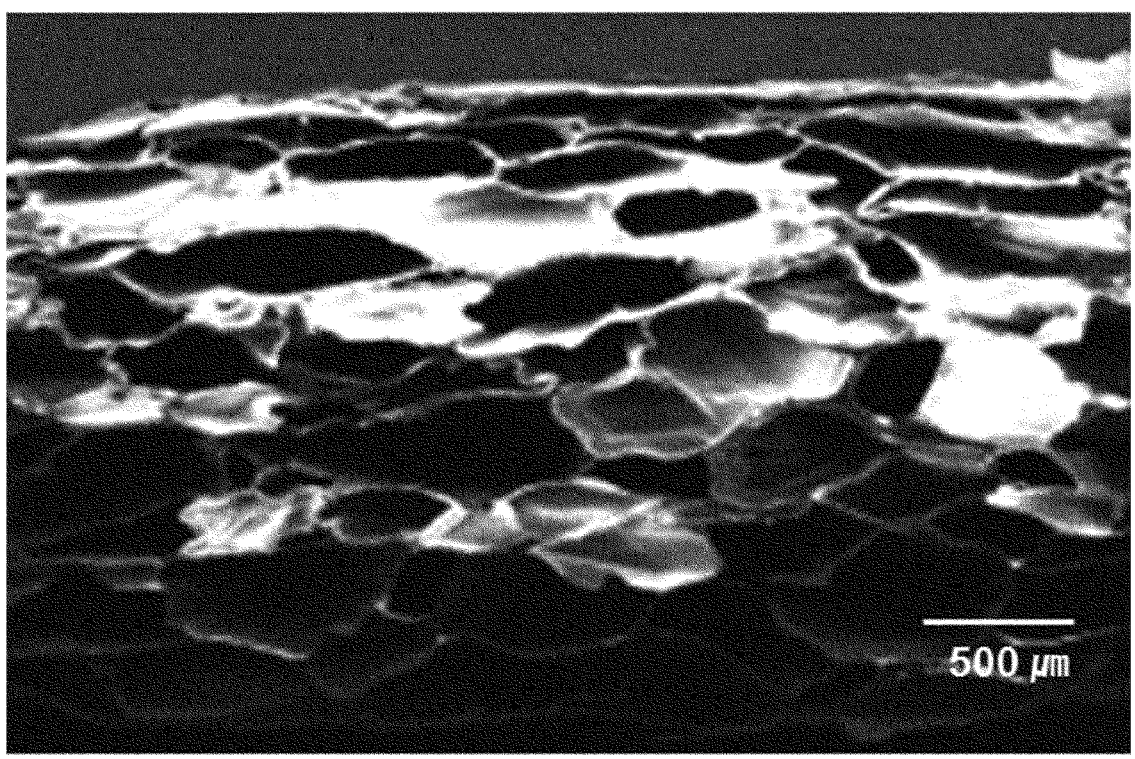
FIG. 3 is an SEM image showing a cell size of a foam sheet of a food container according to Comparative Example 2.

A food container was manufactured by the same method as described in the example, except that an average cell size of a foam sheet was controlled to approximately 900 μm. FIG. 3 is an SEM image showing a cell size of the foam sheet formed according to Comparative Example 2. Referring to FIG. 3, it can be confirmed that cells were formed to have an average size of 900 μm.

Comparative Example 3

A food container manufactured of paper was purchased commercially. At this time, the paper food container had a thickness of approximately 1 mm.

Comparative Example 4

A polypropylene (PP rigid) sheet having a thickness of 1 mm was commercially purchased, and used to mold a food container using the same mold as used in the example.

Experimental Example 1

Elution amounts of a hazardous substance from the food container manufactured in the example and Comparative Example 1 were evaluated. Evaluation was performed by measuring an elution amount of a hazardous substance after each food container was heated in an 800 W microwave oven for 5 minutes, and it was demonstrated that evaluation items satisfy the criteria according to the Ministry of Food and Drug Safety (MFDS) Notification No. 2016-51. The evaluation items and results are shown in in Table 1 below.

TABLE 1

| Classification | Item | Units | Example Standard | Example Analysis result | Comparative Example 1 Standard | Comparative Example 1 Analysis result |
|---|---|---|---|---|---|---|
| Residue specification | Volatile substance (styrene, toluene, ethylbenzene, isopropylene, n-propyl benzene) | mg/kg | — | Not detected | ≤5,000 | 412 (styrene) |
| Elution specification | 4% acetic acid | mg/L | ≤30 | Not detected | ≤30 | 7 |
| | Water | | ≤30 | Not detected | ≤30 | 10 |
| | n-heptane | | ≤30 | 6 | ≤240 | 8 |

Referring to Table 1, while no volatile substance was detected from the food container according to the example, indicating that the food container satisfied the criteria notified by the MFDS, the food container according to Comparative Example 1 contained a large amount of residual styrene, measuring at 412 mg/kg. In the case of the food container according to the example, 4% acetic acid and water were not eluted, whereas in the case of the food container according to Comparative Example 1, 4% acetic acid and water were eluted. Therefore, it was confirmed that the food container according to the present invention can considerably reduce residual and elution amounts of a hazardous substance.

Experimental Example 2

Thermal resistance of the food containers manufactured in the example and Comparative Example 1 was assessed. A measurement method is described below, and the result is shown in Table 2 below.

The thermal resistance was assessed by measuring a dimensional variation according to Mathematical Expression 1 below.

$$|V_1-V_0|/V_0 \times 100 < 5\%$$ [Mathematical Expression 1]

In Mathematical Expression 1, $V_0$ is a volume (mm$^3$) of the food container before being exposed to 100° C., and $V_1$ is a volume (mm$^3$) of the food container after being exposed to 100° C. for 20 minutes.

At this time, the exposure to 100° C. was carried out using a convection oven, and the volume (mm$^3$) of the sample before each of the food containers according to the example and Comparative Example 1 was exposed to 100° C. was 100×100×3 (width×length×height).

TABLE 2

| Classification | Dimensional variation (%) |
|---|---|
| Example | 0 |
| Comparative Example 1 | 5.95 |

Referring to Table 2, it can be seen that although the food container according to the present invention was exposed to a high temperature for a long time, the dimensional variation was approximately 0%, indicating that it has excellent thermal resistance. Compared with this, it can be seen that the food container according to Comparative Example 1 exhibited the dimensional variation of approximately 5.95%, indicating that it did not have excellent thermal resistance. Therefore, it can be shown that when being used at a high temperature, the food container of the present invention does not experience a change in shape, and the food container according to Comparative Example 1 is easily deformed.

Experimental Example 3

To evaluate a thermal barrier property of each of the food containers according to the example, Comparative Example 1, and Comparative Examples 3 and 4, temperatures at a random position inside the container and at a random position outside the container were measured two minutes after 100° C. water was put into the container at 70% (v/v). The result is shown in Table 3 below.

TABLE 3

| Classification | External temperature of container (° C.) | Internal temperature of container (° C.) | Difference in temperature between inside and outside container (° C.) |
|---|---|---|---|
| Example | 40 | 62 | 22 |
| Comparative Example 1 | 40 | 61 | 21 |
| Comparative Example 3 | 45 | 55 | 10 |

TABLE 3-continued

| Classification | External temperature of container (° C.) | Internal temperature of container (° C.) | Difference in temperature between inside and outside container (° C.) |
|---|---|---|---|
| Comparative Example 4 | 42 | 46 | 4 |

Referring to Table 3, the food container according to the example had a difference in temperature between the inside and outside of the container of 22° C., indicating an excellent thermal barrier property, which was similar to that of Comparative Example 1, and the food containers according to Comparative Examples 3 and 4 had the temperature differences of 10° C. and 4° C., respectively, indicating a considerably poor thermal barrier property. Therefore, it was confirmed that the food container according to the present invention is manufactured by applying a PETG resin layer to one surface of a foam sheet with a cell size controlled in a predetermined range, thereby having excellent thermal barrier property, and thus can exhibit excellent heat insulation.

Experimental Example 4

Moisture permeability and oxygen permeability of each of the food containers manufactured in Example and Comparative Example 1 were measured. Methods of measuring moisture permeability and oxygen permeability are described below, and the results are shown in Table 4 below.

1) Test for Moisture Permeability
Test method: ASTM D 1249
Test instrument: Permatran W-700 (MOCON, USA)
Test temperature: (37.8±1) ° C., 100% R.H
Test time: 30 min
Measurement range: 0.05~100 g/m$^2$·day
Sample size: 5 cm$^2$
2) Test for Oxygen Permeability
Test method: ASTM D 3985
Test instrument: OX-TRAN 702 (MOCON, USA)
Test temperature: (23±1) ° C.
Test time: 30 min
Measurement range: 0.1~2000 cc/m$^2$·day
Sample size: 5 cm$^2$

TABLE 4

| Classification | Test item | Units | Measurement result First | Second |
|---|---|---|---|---|
| Example | Moisture permeability | g/m$^2$ · day | 8.23 | 8.69 |
| | Oxygen permeability | cc/m$^2$ · day | 1336 | 893.1 |
| Comparative Example 1 | Moisture permeability | g/m$^2$ · day | 16.60 | 17.30 |
| | Oxygen permeability | cc/m$^2$ · day | 2591.2 | 1003.7 |

Referring to Table 4, in the case of the food container according to the example, both of the first and second measurements showed low moisture permeability, measuring at 8.23 g/m$^2$·day and 8.69 g/m$^2$·day, respectively, and in the case of the food container according to Comparative Example 1, both of the first and second measurements showed high moisture permeability, measuring at 16.60 g/m$^2$·day and 17.30 g/m$^2$·day, respectively, which are higher than those of the food container according to the example. In addition, according to the test for oxygen permeability, the food container according to the example exhibited oxygen permeability, measuring at 1336 cc/m$^2$·day and 893.1 cc/m²·day in the first and second measurements, respectively, which are considerably lower than those of Comparative Example 1.

Therefore, it was confirmed that the food container according to the present invention is highly effective in blocking oxygen and moisture to extend the preservation period of food.

Experimental Example 5

The compressive strength, tensile strength, elongation and puncture strength of each of the food containers manufactured in Example and Comparative Example 1 were measured. An instrument used in measurement was a universal testing machine (Model 3367, Instron), and corresponding measurement conditions are described below, and the results are shown in Table 5.

1) Measurement of Compressive Strength
Compressive strength was assessed by measuring the maximum load measured when a load was applied vertically to the food container at a speed of 100 mm/min.

2) Measurement of Tensile Strength
Tensile strength was measured according to ASTM D 638, and a test speed was 5 mm/min.

3) Measurement of Elongation
Elongation was measured according to ASTM D 638.

4) Measurement of Puncture Strength
Puncture strength was measured according to ASTM D 5748, and a test speed was 6 mm/min.

TABLE 5

| Classification | Compressive strength (kgf/m³) | Tensile strength (MPa) | | Elongation (%) | | Puncture strength (N) |
| --- | --- | --- | --- | --- | --- | --- |
| | | TD | MD | TD | MD | |
| Example | 51.9 | 5.68 | 4.77 | 4.83 | 9.19 | 409.48 |
| Comparative Example 1 | 28 | 3.2 | 2.8 | 2.5 | 3.1 | 210 |

Referring to Table 5, it can be seen that the food container according to the example was not easily deformed by an external force due to remarkably higher compressive strength and tensile strength than those of the food container according to Comparative Example 1, and exhibited excellent moldability due to higher elongation than that of the food container according to Comparative Example 1. In addition, it was confirmed that the food container according to the example exhibited higher puncture strength than the food container of Comparative Example 1, and thus was highly resistant to physical shocks.

Therefore, it can be seen that the food container according to the present invention can be used in a microwave oven due to improved thermal resistance by forming a PETG coating layer to a suitable thickness on the outer layer of a PET foam sheet, and have improved compressive strength, tensile strength, elongation and puncture strength.

Experimental Example 6

Figure 4:
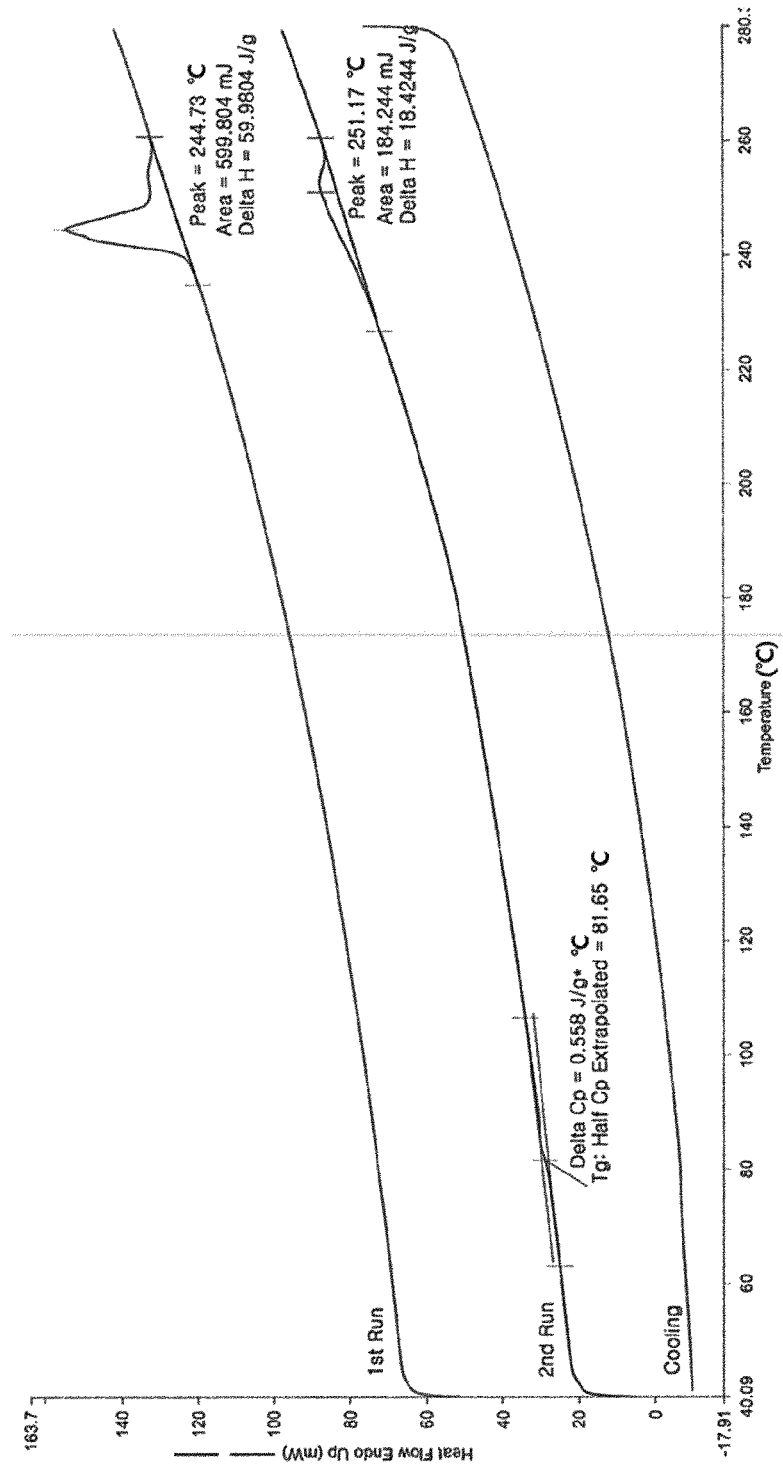
FIG. 4 is a graph showing a melting point (Tm) and a glass transition temperature (Tg) of a polyethylene terephthalate (PET) resin used in an example.
Figure 5:
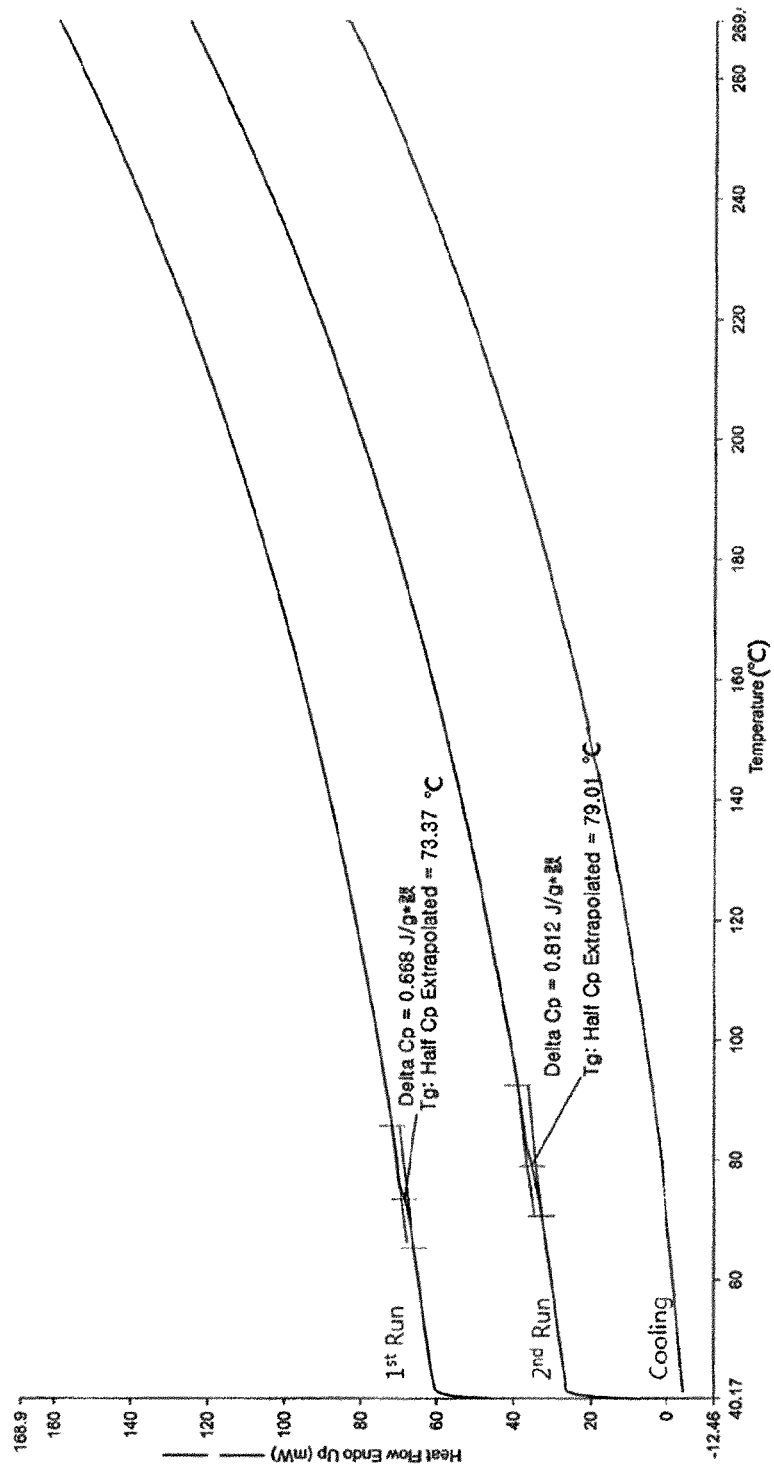
FIG. 5 is a graph showing a melting point (Tm) and a glass transition temperature (Tg) of a polyethylene terephthalate glycol (PETG) resin used in an example.

To evaluate physical properties of the food container according to the present invention, a melting point (Tm) and a glass transition temperature (Tg) of the PET resin and the PETG resin used in manufacture of the food container according to the example were measured within a range from 40 to 270° C. (increased by 20° C./min) using a differential scanning calorimeter (Perkin Elmer, DSC-7). The results are shown in Table 6, and in FIGS. 4 and 5. FIG. 4 is a graph showing the melting point (Tm) and the glass transition temperature (Tg) of the PET resin, and FIG. 5 is a graph showing the melting point (Tm) and the glass transition temperature (Tg) of the PETG resin.

TABLE 6

| | Tm (° C.) | Tg (° C.) |
| --- | --- | --- |
| PET | 251.17 | 81.65 |
| PETG | — | 79.01 |

Referring to Table 6 and FIG. 4, the melting point of the PET resin was approximately 251.17° C., and the glass transition temperature of the PET resin was approximately 81.65° C. Meanwhile, the melting point of the PETG resin was not measured, and the glass transition temperature of the PETG resin was approximately 79.01° C., which is similar to that of the PET resin (refer to FIG. 5). Therefore, it can be seen that the PETG resin has a non-crystalline characteristic, and that it is possible to implement an excellent adhesive property, excellent processability and excellent thermal resistance by manufacturing a food container using the PETG resin coating layer.

INDUSTRIAL APPLICABILITY

A food container according to the present invention has a multilayer structure which has a foamed layer controlled in cell size and a resin layer laminated on one or both surfaces of the foamed layer, thereby improving compressive strength, and having less deformation due to a physical force and improved moldability due to improved elongation, so that it can be provided in various sizes and shapes. The food container according to the present invention can easily store food due to low oxygen and moisture permeability, and prevent deformation even in high-temperature water due to excellent heat resistance. In addition, the food container according to the present invention is harmless to the human body due to a considerably low elution amount of a hazardous substance, and has improved strength, printability and moldability and a superior thermal barrier property, thereby exhibiting improved heat insulation for food.

The invention claimed is:

1. A food container comprising:
a bilayer structure which includes a foamed layer formed on an inner layer of the container and having an average cell size of 100 to 500 μm; and
a resin layer formed on an outer layer of the container and laminated on one surface of the foamed layer,
wherein the resin layer is formed of a resin having a repeating unit of Formula 1 below:

[Formula 1]

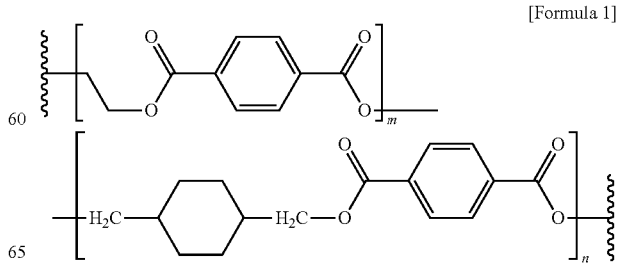

wherein m and n represent mole fractions of repeating units, and range from 1 to 100, respectively, wherein 90% or more of cells of the foamed layer are closed cells (DIN ISO4590), wherein the foamed layer is a foam sheet of a polyethylene terephthalate resin, and the resin layer is a coating layer of a polyethylene terephthalate resin, in which a difference in temperature between an inside and an outside of the container is 10° C. or more, which is measured, under ambient conditions at room temperature, two minutes after water of 60 to 100° C. is placed into the container at 70% (v/v).

2. The food container according to claim 1, wherein the resin forming the resin layer has a polymerization unit derived from cyclohexanedimethanol (CHDM) in a molecule at a content of 10 mol % or more.

3. The food container according to claim 1, wherein the resin forming the resin layer does not have a melting point (Tm) ranging from 120 to 270° C.

4. The food container according to claim 1, which has a styrene elution amount of 50 mg/kg or less when heated in an 800 W microwave oven for 5 minutes.

5. The food container according to claim 1, wherein the foamed layer has a density of 30 to 400 kgf/m$^3$, and the resin layer is a coating layer of a polyethylene terephthalate glycol resin.

6. The food container according to claim 1, wherein the multilayer structure forming the food container has an average thickness of 1 to 5 mm, and a thickness ratio of the foamed layer and the resin layer is 10:0.1 to 2.

7. The food container according to claim 1, wherein the food container satisfies a condition represented by Mathematical Expression 1 below:

$$|V_1-V_0|/V_0 \times 100 < 5\%$$ [Mathematical Expression 1]

In Mathematical Expression 1, $V_0$ is a volume (mm$^3$) of the food container before being exposed to 100° C., and $V_1$ is a volume (mm$^3$) of the food container after being exposed to 100° C. for 20 minutes.

8. The food container according to claim 1, which has a compressive strength of 40 kgf or more, measured when a load is applied vertically at a speed of 100 mm/min.

* * * * *